(12) United States Patent
Kasterstein et al.

(10) Patent No.: US 10,713,312 B2
(45) Date of Patent: Jul. 14, 2020

(54) SYSTEM AND METHOD FOR CONTEXT-LAUNCHING OF APPLICATIONS

(71) Applicant: Doat Media Ltd., Tel Aviv (IL)

(72) Inventors: Rami Kasterstein, Givataim (IL); Joey Joseph Simhon, Ramat Gan (IL); Avi Charkham, Givataim (IL)

(73) Assignee: DOAT Media Ltd., Tel Aviv (IL)

( * ) Notice: Subject to any disclaimer, the term of this patent is extended or adjusted under 35 U.S.C. 154(b) by 1192 days.

(21) Appl. No.: 14/955,831

(22) Filed: Dec. 1, 2015

(65) Prior Publication Data

US 2016/0077715 A1    Mar. 17, 2016

Related U.S. Application Data

(63) Continuation-in-part of application No. 14/850,200, filed on Sep. 10, 2015, now Pat. No. 10,114,534, and a continuation-in-part of application No. 14/583,310, filed on Dec. 26, 2014, now abandoned, said application No. 14/850,200 is a continuation of application No. 13/712,563, filed on Dec. 12, 2012, now Pat. No. 9,141,702, which is a continuation-in-part of application No. 13/296,619, filed on Nov. 15, 2011, now abandoned, and a
(Continued)

(51) Int. Cl.
  *G06F 16/34*        (2019.01)
  *G06F 16/9535*      (2019.01)
  *G06F 16/2457*      (2019.01)
  *G06F 16/951*       (2019.01)

(52) U.S. Cl.
  CPC .................. *G06F 16/9535* (2019.01)

(58) Field of Classification Search
  CPC .... G06F 16/34; G06F 16/951; G06F 16/9535; G06F 16/24575; G06F 16/245
  USPC ................................................. 707/760, 770
  See application file for complete search history.

(56) References Cited

U.S. PATENT DOCUMENTS 5,911,043 A    6/1999    Duffy et al.
5,924,090 A    7/1999    Krellenstein
(Continued)

FOREIGN PATENT DOCUMENTS

EP    2288113 A1    2/2011
JP    2009278342    11/2009
(Continued)

OTHER PUBLICATIONS

*Alice Corp V. CLS Bank International*, 573 US___ 134 S. Ct. 2347 (2014).
(Continued)

*Primary Examiner* — James Trujillo
*Assistant Examiner* — Fariborz Khoshnoodi
(74) *Attorney, Agent, or Firm* — M&B IP Analysts, LLC

(57) ABSTRACT

A system, method, and user device for executing actions respective of contextual scenarios. The method comprises: determining at least one variable based in part on at least one signal captured by at least one sensor of the user device; generating at least one insight based on the at least one variable; generating a context for the user device based on the at least one insight; determining, based on the context, a user intent, wherein the user intent includes at least one action; and causing execution of the at least one action on the user device.

22 Claims, 3 Drawing Sheets

Related U.S. Application Data continuation-in-part of application No. 13/156,999, filed on Jun. 9, 2011, now Pat. No. 9,323,844, said application No. 14/583,310 is a continuation-in-part of application No. 13/712,563, filed on Dec. 12, 2012, now Pat. No. 9,141,702.

(60) Provisional application No. 62/086,728, filed on Dec. 3, 2014, provisional application No. 61/920,784, filed on Dec. 26, 2013, provisional application No. 61/468,095, filed on Mar. 28, 2011, provisional application No. 61/354,022, filed on Jun. 11, 2010.

(56) References Cited

U.S. PATENT DOCUMENTS

| | | | |
|---|---|---|---|
| 6,101,529 | A | 8/2000 | Chrabaszcz |
| 6,484,162 | B1 | 11/2002 | Edlund et al. |
| 6,546,388 | B1 | 4/2003 | Edlund et al. |
| 6,560,590 | B1 | 5/2003 | Shwe et al. |
| 6,564,213 | B1 | 5/2003 | Ortega et al. |
| 6,605,121 | B1 | 8/2003 | Roderick |
| 6,668,177 | B2 | 12/2003 | Salmimaa et al. |
| 7,181,438 | B1 | 2/2007 | Szabo |
| 7,266,588 | B2 | 9/2007 | Oku |
| 7,302,272 | B2 | 11/2007 | Ackley |
| 7,359,893 | B2 | 4/2008 | Sadri et al. |
| 7,376,594 | B2 | 5/2008 | Nigrin |
| 7,461,061 | B2 | 12/2008 | Aravamudan et al. |
| 7,529,741 | B2 | 5/2009 | Aravamudan et al. |
| 7,533,084 | B2 | 5/2009 | Holloway et al. |
| 7,565,383 | B2 | 7/2009 | Gebhart et al. |
| 7,594,121 | B2 | 9/2009 | Eytchison et al. |
| 7,599,925 | B2 | 10/2009 | Larson et al. |
| 7,636,900 | B2 | 12/2009 | Xia |
| 7,707,142 | B1 | 4/2010 | Ionescu |
| 7,721,192 | B2 | 5/2010 | Milic-Frayling et al. |
| 7,774,003 | B1 | 8/2010 | Ortega et al. |
| 7,783,419 | B2 | 8/2010 | Taniguchi et al. |
| 7,792,815 | B2 | 9/2010 | Aravamudan et al. |
| 7,797,298 | B2 | 9/2010 | Sareen et al. |
| 7,899,829 | B1 * | 3/2011 | Malla ............... G06F 16/9562 707/741 |
| 7,958,141 | B2 | 6/2011 | Sundaresan et al. |
| 7,966,321 | B2 | 6/2011 | Wolosin et al. |
| 7,974,976 | B2 | 7/2011 | Yahia et al. |
| 8,032,666 | B2 | 10/2011 | Srinivansan et al. |
| 8,073,860 | B2 | 12/2011 | Venkataraman et al. |
| 8,086,604 | B2 | 12/2011 | Arrouye et al. |
| 8,271,333 | B1 | 9/2012 | Grigsby et al. |
| 8,312,484 | B1 | 11/2012 | McCarty et al. |
| 8,392,449 | B2 | 3/2013 | Pelenur et al. |
| 8,571,538 | B2 | 10/2013 | Sprigg et al. |
| 8,572,129 | B1 | 10/2013 | Lee et al. |
| 8,606,725 | B1 | 12/2013 | Agichtein et al. |
| 8,626,589 | B2 | 1/2014 | Sengupta et al. |
| 8,700,804 | B1 | 4/2014 | Meyers et al. |
| 8,718,633 | B2 | 5/2014 | Sprigg et al. |
| 8,793,265 | B2 | 7/2014 | Song et al. |
| 8,799,273 | B1 | 8/2014 | Chang et al. |
| 8,825,597 | B1 | 9/2014 | Houston et al. |
| 8,843,853 | B1 | 9/2014 | Smoak et al. |
| 2003/0018778 | A1 | 1/2003 | Martin et al. |
| 2003/0182394 | A1 * | 9/2003 | Ryngler ............ G01C 21/3629 709/217 |
| 2004/0186989 | A1 | 9/2004 | Clapper |
| 2004/0229601 | A1 | 11/2004 | Zabawskyj et al. |
| 2005/0060297 | A1 | 3/2005 | Najork |
| 2005/0071328 | A1 | 3/2005 | Lawrence |
| 2005/0076367 | A1 | 4/2005 | Johnson et al. |
| 2005/0102407 | A1 | 5/2005 | Clapper |
| 2005/0108406 | A1 | 5/2005 | Lee et al. |
| 2005/0138043 | A1 * | 6/2005 | Lokken ............... G06Q 30/02 |
| 2005/0149496 | A1 | 7/2005 | Mukherjee et al. |
| 2005/0232423 | A1 | 10/2005 | Horvitz et al. |
| 2005/0243019 | A1 | 11/2005 | Fuller et al. |
| 2005/0283468 | A1 | 12/2005 | Kamvar et al. |
| 2006/0004675 | A1 | 1/2006 | Bennett et al. |
| 2006/0031529 | A1 | 2/2006 | Keith |
| 2006/0064411 | A1 | 3/2006 | Gross et al. |
| 2006/0085408 | A1 | 4/2006 | Morsa |
| 2006/0089945 | A1 | 4/2006 | Paval |
| 2006/0095389 | A1 | 5/2006 | Hirota et al. |
| 2006/0112081 | A1 | 5/2006 | Qureshi |
| 2006/0129931 | A1 | 6/2006 | Simons et al. |
| 2006/0136403 | A1 | 6/2006 | Koo |
| 2006/0167896 | A1 | 7/2006 | Kapur et al. |
| 2006/0190439 | A1 | 8/2006 | Chowdhury et al. |
| 2006/0200761 | A1 | 9/2006 | Judd et al. |
| 2006/0206803 | A1 | 9/2006 | Smith |
| 2006/0217953 | A1 | 9/2006 | Parikh |
| 2006/0224448 | A1 | 10/2006 | Herf |
| 2006/0224593 | A1 | 10/2006 | Benton et al. |
| 2006/0248062 | A1 | 11/2006 | Libes et al. |
| 2006/0265394 | A1 | 11/2006 | Raman et al. |
| 2006/0271520 | A1 | 11/2006 | Ragan |
| 2006/0277167 | A1 | 12/2006 | Gross et al. |
| 2007/0011167 | A1 | 1/2007 | Krishnaprasad et al. |
| 2007/0055652 | A1 | 3/2007 | Hood et al. |
| 2007/0082707 | A1 | 4/2007 | Flynt et al. |
| 2007/0112739 | A1 | 5/2007 | Burns et al. |
| 2007/0136244 | A1 | 6/2007 | MacLaurin et al. |
| 2007/0174900 | A1 | 7/2007 | Marueli et al. |
| 2007/0195105 | A1 | 8/2007 | Koberg |
| 2007/0204039 | A1 | 8/2007 | Inamdar |
| 2007/0226242 | A1 | 9/2007 | Wang et al. |
| 2007/0239724 | A1 | 10/2007 | Ramer et al. |
| 2007/0255831 | A1 | 11/2007 | Hayashi et al. |
| 2007/0300185 | A1 | 12/2007 | Macbeth et al. |
| 2008/0065685 | A1 | 3/2008 | Frank |
| 2008/0077883 | A1 | 3/2008 | Kim et al. |
| 2008/0082464 | A1 | 4/2008 | Ozzie et al. |
| 2008/0104195 | A1 | 5/2008 | Hawkins et al. |
| 2008/0114759 | A1 | 5/2008 | Yahia et al. |
| 2008/0133605 | A1 | 6/2008 | MacVarish |
| 2008/0172362 | A1 | 7/2008 | Shacham et al. |
| 2008/0172374 | A1 | 7/2008 | Wolosin et al. |
| 2008/0222140 | A1 | 9/2008 | Lagad et al. |
| 2008/0256443 | A1 | 10/2008 | Li et al. |
| 2008/0306913 | A1 | 12/2008 | Newman et al. |
| 2008/0306937 | A1 | 12/2008 | Whilte et al. |
| 2008/0307343 | A1 | 12/2008 | Robert et al. |
| 2009/0013052 | A1 | 1/2009 | Robarts et al. |
| 2009/0013285 | A1 | 1/2009 | Blyth et al. |
| 2009/0031236 | A1 | 1/2009 | Robertson et al. |
| 2009/0049052 | A1 | 2/2009 | Sharma et al. |
| 2009/0063491 | A1 | 3/2009 | Barclay et al. |
| 2009/0070318 | A1 | 3/2009 | Song et al. |
| 2009/0077034 | A1 | 3/2009 | Kim et al. |
| 2009/0077047 | A1 | 3/2009 | Cooper et al. |
| 2009/0094213 | A1 | 4/2009 | Wang |
| 2009/0125374 | A1 | 5/2009 | Deaton et al. |
| 2009/0125482 | A1 | 5/2009 | Peregrine et al. |
| 2009/0150792 | A1 | 6/2009 | Laakso et al. |
| 2009/0210403 | A1 | 8/2009 | Reinshmidt et al. |
| 2009/0228439 | A1 | 9/2009 | Manolescu et al. |
| 2009/0234811 | A1 | 9/2009 | Jamil et al. |
| 2009/0234814 | A1 | 9/2009 | Boerries et al. |
| 2009/0239587 | A1 | 9/2009 | Negron et al. |
| 2009/0240680 | A1 | 9/2009 | Tankovich et al. |
| 2009/0265328 | A1 | 10/2009 | Parekh et al. |
| 2009/0277322 | A1 | 11/2009 | Cai et al. |
| 2009/0327261 | A1 | 12/2009 | Hawkins |
| 2010/0030753 | A1 | 2/2010 | Nad et al. |
| 2010/0042912 | A1 | 2/2010 | Whitaker |
| 2010/0082661 | A1 | 4/2010 | Beaudreau |
| 2010/0094854 | A1 | 4/2010 | Rouhani-Kalleh |
| 2010/0106706 | A1 | 4/2010 | Rorex et al. |
| 2010/0162183 | A1 | 6/2010 | Crolley |
| 2010/0184422 | A1 | 7/2010 | Ahrens |
| 2010/0228715 | A1 | 9/2010 | Lawrence |
| 2010/0257552 | A1 | 10/2010 | Sharan et al. |
| 2010/0262597 | A1 | 10/2010 | Han |
| 2010/0268673 | A1 | 10/2010 | Quadracci |

(56) References Cited

U.S. PATENT DOCUMENTS

| | | | |
|---|---|---|---|
| 2010/0274775 A1 | 10/2010 | Fontes et al. | |
| 2010/0280983 A1* | 11/2010 | Cho | G06F 3/0346 706/46 |
| 2010/0299325 A1 | 11/2010 | Tzvi et al. | |
| 2010/0306191 A1 | 12/2010 | Lebeau et al. | |
| 2010/0312782 A1 | 12/2010 | Li et al. | |
| 2010/0332958 A1 | 12/2010 | Weinberger et al. | |
| 2011/0029541 A1 | 2/2011 | Schulman | |
| 2011/0029925 A1 | 2/2011 | Robert et al. | |
| 2011/0035699 A1 | 2/2011 | Robert et al. | |
| 2011/0041094 A1 | 2/2011 | Robert et al. | |
| 2011/0047145 A1 | 2/2011 | Ershov | |
| 2011/0047510 A1 | 2/2011 | Yoon | |
| 2011/0055759 A1 | 3/2011 | Robert et al. | |
| 2011/0058046 A1 | 3/2011 | Yoshida et al. | |
| 2011/0072492 A1 | 3/2011 | Mohler et al. | |
| 2011/0078767 A1 | 3/2011 | Cai et al. | |
| 2011/0093488 A1 | 4/2011 | Amacker et al. | |
| 2011/0131205 A1 | 6/2011 | Iyer et al. | |
| 2011/0225145 A1 | 9/2011 | Greene et al. | |
| 2011/0252329 A1 | 10/2011 | Broman | |
| 2011/0264656 A1 | 10/2011 | Dumais et al. | |
| 2011/0295700 A1 | 12/2011 | Gilbane et al. | |
| 2011/0314419 A1 | 12/2011 | Dunn et al. | |
| 2012/0158685 A1 | 6/2012 | White et al. | |
| 2012/0166411 A1 | 6/2012 | MacLaurin et al. | |
| 2012/0198347 A1 | 8/2012 | Hirvonen et al. | |
| 2012/0284247 A1 | 11/2012 | Jiang et al. | |
| 2012/0284256 A1 | 11/2012 | Mahajan et al. | |
| 2013/0132896 A1 | 5/2013 | Lee et al. | |
| 2013/0166525 A1 | 6/2013 | Naranjo et al. | |
| 2013/0173513 A1 | 7/2013 | Chu et al. | |
| 2013/0219319 A1 | 8/2013 | Park et al. | |
| 2013/0290319 A1 | 10/2013 | Glover et al. | |
| 2013/0290321 A1 | 10/2013 | Shapira et al. | |
| 2014/0007057 A1 | 1/2014 | Gill et al. | |
| 2014/0025502 A1 | 1/2014 | Ramer et al. | |
| 2014/0049651 A1 | 2/2014 | Voth | |
| 2014/0279013 A1 | 9/2014 | Chelly et al. | |
| 2015/0032714 A1 | 1/2015 | Simhon et al. | |

FOREIGN PATENT DOCUMENTS

| | | |
|---|---|---|
| JP | 20090285550 A1 | 11/2009 |
| JP | 2011044147 | 3/2011 |
| KR | 20030069127 | 8/2003 |
| KR | 20070014595 | 2/2007 |
| KR | 20110009955 | 1/2011 |
| WO | 2007047464 | 4/2007 |
| WO | 2009117582 | 9/2009 |
| WO | 2010014954 | 2/2010 |
| WO | 2011016665 | 2/2011 |
| WO | 2012083540 A1 | 6/2012 |

OTHER PUBLICATIONS

"Categories App Helps Organize iPhone Apps on your iPhone's Home Screen," iPhoneHacks, url: http://www.phonehacks.com/2008/10/categoriesapp.html, pp. 1-4, date of publication: Oct. 5, 2008.

"iOS 4.2 for iPad New Features: Folders," Purcell, url: http://notebooks.com/2010/11/22/ios-4-2-foripad-new-features-folders/, pp. 1-5, date of publication Nov. 22, 2010.

Foreign Office Action for Patent Application No. 201380000403.X dated Jun. 2, 2017 by the State Intellectual Property Office of the P.R.C.

Chinese Foreign Action dated Mar. 13, 2017 from the State Intellectual Property of the P.R.C. for Chinese Patent Application: 201280004301.0, China.

The Second Office Action for Chinese Patent Application No. 201280004301.0 dated Jan. 19, 2018, SIPO.

Second Office Action for Chinese Patent Application No. 201280004300.6 dated Aug. 23, 2017, SIPO.

Foreign Office Action for JP2015-537680 dated Dec. 6, 2016 from the Japanese Patent Office.

Kurihara, et al., "How to Solve Beginner's Problem, Mac Fan Supports" Mac Fan, Mainichi Communications Cooperation, Dec. 1, 2009, vol. 17, 12th issue, p. 92.

Notice of the First Office Action for Chinese Patent Application No. 201280004300.6, State Intellectual Property Office of the P.R.C., dated Oct. 26, 2016.

Chinese Foreign Action dated Sep. 3, 2018 from the State Intellectual Property of the P.R.C. for Chinese Patent Application: 201280004301.0, China.

Currie, Brenton, Apple adds search filters, previous purchases to iPad App Store, Neowin.net, Feb. 5, 2011, http://www.neowin.net/news/apple-adds-search-filters-previous-purchases-to-ipad-app-store.

International Search Authority: "Written Opinion of the International Searching Authority" (PCT Rule 43bis.1) including International Search Report for International Patent Application No. PCT/US2012/059548, dated Mar. 26, 2013.

International Search Authority: "Written Opinion of the International Searching Authority" (PCT Rule 43bis.1) including International Search Report for corresponding International Patent Application No. PCT/US2012/069250, dated Mar. 29, 2013.

International Searching Authority: International Search Report including "Written Opinion of the International Searching Authority" (PCT Rule 43bis.1) for the related International Patent Application No. PCT/US2011/039808, dated Feb. 9, 2012.

Nie et al., "Object-Level Ranking: Bringing Order to Web Objects", International World Wide Web Conference 2005; May 10-14, 2005; Chiba, Japan.

Qin et al., "Learning to Rank Relationship Objects and Its Application to Web Search", International World Wide Web Conference 2008 / Refereed Track: Search—Ranking & Retrieval Enhancement; Apr. 21-25, 2008; Beijing, China.

Kurihara, et al., "How to Solve Beginner's Problem, Mac Fan Supports" Mac Fan, Mainichi Communications Cooperation, Dec. 1, 2009, vol. 17, 12th issue, p. 92, Translated.

\* cited by examiner

SYSTEM AND METHOD FOR CONTEXT-LAUNCHING OF APPLICATIONS

CROSS-REFERENCE TO RELATED APPLICATIONS

This application claims the benefit of U.S. Provisional Application No. 62/086,728 filed on Dec. 3, 2014. This application is also a continuation-in-part of U.S. patent application Ser. No. 14/850,200 filed on Sep. 10, 2015 which is a continuation of U.S. patent application Ser. No. 13/712,563 filed on Dec. 12, 2012, now U.S. Pat. No. 9,141,702. The Ser. No. 13/712,563 application is a continuation-in-part of:

(a) U.S. patent application Ser. No. 13/156,999 filed on Jun. 9, 2011, which claims the benefit of U.S. provisional patent application No. 61/468,095 filed Mar. 28, 2011 and U.S. provisional application No. 61/354,022, filed Jun. 11, 2010; and (b) U.S. patent application Ser. No. 13/296,619 filed on Nov. 15, 2011, now pending.

This application is also a continuation-in-part of U.S. patent application Ser. No. 14/583,310 filed on Dec. 26, 2014, now pending. The Ser. No. 14/583,310 application claims the benefit of U.S. Provisional Patent Application No. 61/920,784 filed on Dec. 26, 2013. The Ser. No. 14/583,310 application is also a continuation-in-part of the Ser. No. 13/712,563 application. The contents of the above-referenced applications are hereby incorporated by reference.

TECHNICAL FIELD

The present disclosure relates generally to analysis of user behavior, and more specifically to systems and methods for generating contextual scenarios respective of user device activity.

BACKGROUND

Mobile launchers are used for navigating through content existing on mobile devices as well as content available over the World Wide Web. The mobile launchers usually configure user interfaces and/or provide content upon receiving requests from a user of the mobile device. Such requests are usually received as a query that a user provides via the interfaces.

As content providers are usually motivated by financial incentives, the content may not be user-oriented. As a result, users may not receive content that efficiently meets their requirements. Specifically, the content may be arranged or otherwise presented so as to emphasize content that provides a financial benefit for content providers rather than emphasizing content that best matches the user's needs at a given time. As a result, user would be required to wade through significant amounts of content that are irrelevant to their present needs before finding relevant content. This would waste user time and computing resources, and may result in user frustration.

Further, even when content is intended to be user-oriented, existing mobile launchers face several drawbacks with respect to user convenience. For example, existing mobile launchers typically require interaction with the user to obtain desired content. The interaction with the user device may be undesirable when, e.g., the user is driving or otherwise engaged in activity that makes interaction difficult or unsafe. Additionally, due to the increasing number of sources of content, a user may not be aware of which content source will provide appropriate content based on the user's current intent.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a method for executing actions respective of contextual scenarios. The method comprises determining at least one variable based in part on at least one signal captured by at least one sensor of the user device; generating at least one insight based on the at least one variable; generating a context for the user device based on the at least one insight; determining, based on the context, a user intent, wherein the user intent includes at least one action; and causing execution of the at least one action on the user device.

The disclosed embodiments also include a user device configured to execute actions respective of contextual scenarios related to the user device. The user device comprises at least one sensor; a processing unit; and a memory, the memory containing instructions that, when executed by the processing unit, configure the user device to: determine at least one variable based in part on at least one signal captured by the at least one sensor; generate at least one insight respective of the at least one environmental variable generated by the at least one sensor; generate a context for the user device respective of the at least one insight; determine, based on the context, a user intent, wherein the user intent includes at least one action; and execute the at least one action.

The disclosed embodiments also include a system for executing actions respective of contextual scenarios related to a user device. The system comprises a processing unit; and a memory, the memory containing instructions that, when executed by the processing unit, configure the system to: determine at least one variable based in part on at least one signal captured by at least one sensor of the user device; generate at least one insight based on the at least one variable; generate a context for the user device based on the at least one insight; determine, based on the context, a user intent, wherein the user intent includes at least one action; and cause execution of the at least one action on the user device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
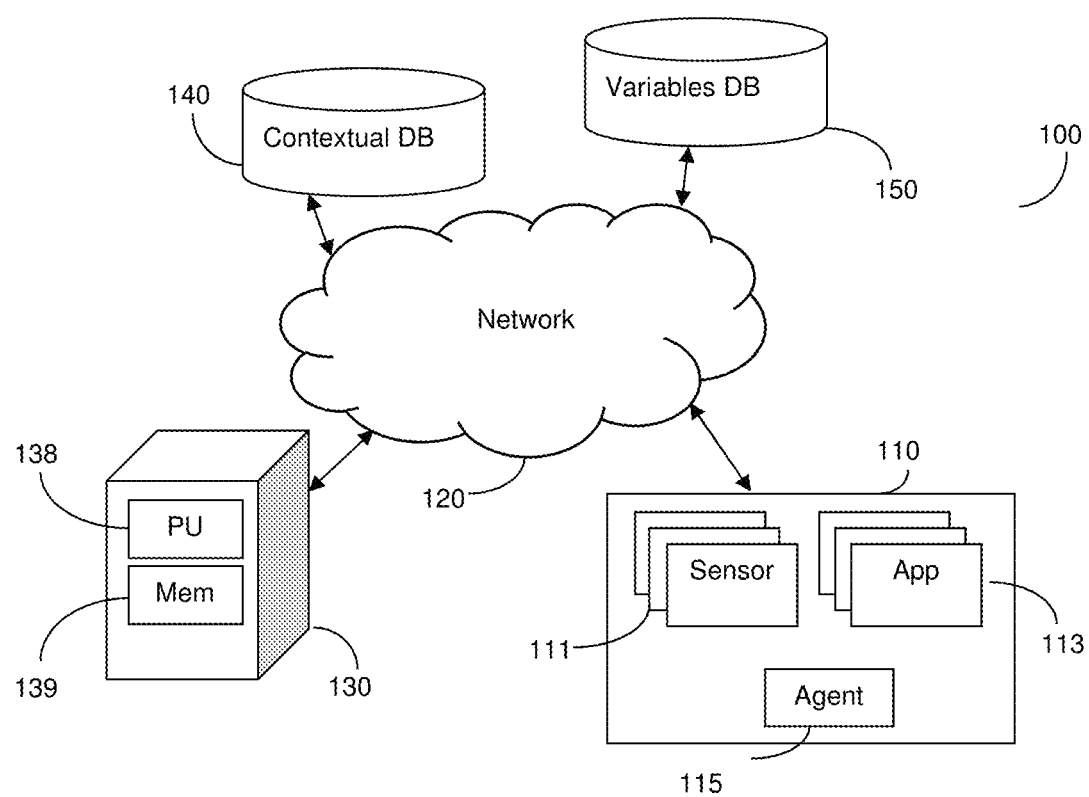
FIG. 1 is a schematic diagram of a system utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for executing actions on a user device respective of context. Insights are generated based on signals collected by the user device. The collected insights are analyzed and aggregated. Contextual scenarios are generated respective of the analysis and aggregation. Based on the contextual scenarios, actions are executed.

FIG. 1 shows an exemplary and non-limiting schematic diagram of a networked system 100 utilized to describe the various disclosed embodiments. The system 100 includes a user device 110, a network 120, a context enrichment server (CES) 130, a contextual database (DB) 140, and a variables database (DB) 150. The user device 110, the databases 140 and 150, and the CES 130 are communicatively connected to the network 120. The network 120 may be, but is not limited to, a local area network (LAN), a wide area network (WAN), a metro area network (MAN), the world wide web (WWW), the Internet, a wired network, a wireless network, and the like, as well as any combination thereof. The user device 110 may be a smart phone, a mobile phone, a laptop, a tablet computer, a wearable computing device, a personal computer (PC), a smart television, a portable device having a processing unit integrated therein, and the like. In certain implementations, the contextual database (DB) 140 and a variables database (DB) 150 may be implemented in a single storage device.

The user device may allow access to a plurality of applications 113 (hereinafter referred to individually as an application (app) 113 and collectively as applications 113, merely for simplicity purposes). An application 113 may include a native application and/or a virtual application. A native application (or app) is installed and executed on the user device 110. A virtual application (app) is executed on a server and only relevant content is rendered and sent to the user device 110. That is, the virtual application typically runs within a browser embedded in another program, thereby permitting users to utilize virtual versions of the application without any download to the user device 110 directly.

The user device 110 has an agent 115 installed therein. The agent 115 may be implemented as an application program having instructions that reside in a memory of the respective user device 110. The agent 115 is communicatively connected to the CES 130 over the network 120. The user device 110 further includes a plurality of sensors 111-1 through 111-N (hereinafter referred to collectively as sensors 111 and individually as a sensor 111, merely for simplicity purposes) implemented thereon. The sensors 111 are configured to collect signals related to a current state of a user of the user device 110. The sensors 111 may include, but are not limited to, a global positioning system (GPS), a temperature sensor, an accelerometer, a gyroscope, a microphone, a speech recognizer, a camera, a web camera, a touch screen, and so on. The signals may include, but are not limited to, raw data related to a user of the user device and/or to the user device 110.

In an embodiment, the agent 115 may be configured to determine one or more variables based on the sensor signals and to send the determined variables to the CES 130. Such variables may include environmental variables that indicate, for example, temporal information (e.g., a time of day, a day, a week, a month, a year), location information, motion information, weather information, sounds, images, user interactions with the user device 110, connections to external devices, and so on. In an embodiment, any of the variables may be received from a resource external to the user device 110, e.g., from the variables database 150. Optionally, the received variables may further include personal variables such as, e.g., a user profile, demographic information related to the user, user preferences, and so on.

Respective of the variables, the CES 130 is configured to generate one or more insights related to a user of the user device 110. The insights may include, but are not limited to, classifications of variables as well as conclusions based on the variables. The insights may include environmental insights and/or personal insights. Environmental insights may be generally generated based on variables over which users have typically limited or no control. Examples for such variable include, but not limited to, a time of day, location, motion information, weather information, sounds, images and more. Personal insights may include, but are not limited to, user profile information of the user, demographic information related to the user, actions executed by the user on the user device 110, and so on.

As a non-limiting example, an environmental insight related to a variable indicating a time of 1:00 P.M. on a Monday may classify the variable as a temporal variable and may include a conclusion that the user is at work. As another non-limiting example, an environmental insight related to a variable indicating a Bluetooth connection to a computing system in a car may classify the variable as a connection and include a conclusion that the user is driving and is about to drive.

Based on the insights, the CES 130 is configured to determine a contextual scenario of a context related to the user device 110. The determination of the contextual scenario is performed by the CES 130 using a contextual database 140 having stored therein a plurality of contexts associated with a plurality of respective insights. The context represents a current state of the user as demonstrated via the insights. In an embodiment, based on the contextual scenario, the CES 130 is configured to predict an intent of the user.

The intent may represent the type of content, the content, and/or actions that may be of an interest to the user at a current time period. For example, if the time is 8 A.M. and it is determined that the user device 110 is communicatively connected to a car via Bluetooth, the user intent may be related to "traffic update." In an embodiment, the sensor signals may be further monitored to determine any changes that may in turn change the intent. In a further embodiment, the changed signals may be analyzed to determine a current (updated) intent of the user.

The CES 130 is further configured to perform a plurality of actions on the user device 110 via the agent 115 based on the contextual scenarios. The actions may include, but are not limited to, displaying and/or launching application programs, displaying and/or providing certain content from the web and/or from the user device 110, and so on.

In an embodiment, performing of an action may include selecting resources (not shown) that would serve the user intent. The resources may be, but are not limited to, web search engines, servers of content providers, vertical comparison engines, servers of content publishers, mobile applications, widgets installed on the user device 110, and so on. In certain configurations, the resources may include "cloud-based" applications, that is, applications executed by servers in a cloud-computing infrastructure, such as, but not limited to, a private-cloud, a public-cloud, or any combination thereof. Selecting resources based on user intent is described further in the above-reference U.S. patent application Ser. No. 13/712,563, assigned to the common assignee, which is hereby incorporated by reference.

The actions to be performed may be determined so as to fulfill the determined user intent(s). For example, if the user intent is determined to be "soccer game update," the actions performed may be to launch a sports news application program and/or to display a video clip showing highlights of the most recent soccer game. As another example, if the user intent is determined to be "weather forecast," the actions performed may be to launch a weather application and/or to display an article from the Internet regarding significant meteorological events.

The CES 130 typically includes a processing unit (PU) 138 and a memory (mem) 139 containing instructions to be executed by the processing unit 138. The processing unit 138 may comprise, or be a component of, a larger processing unit implemented with one or more processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information.

The memory 139 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing unit 138, cause the processing unit 138 to perform the various functions described herein.

The agent 115 In some implementations, the agent 115 can operate and be implemented as a stand-alone program or, alternatively, can communicate and be integrated with other programs or applications executed in the user device 110.

Figure 2:
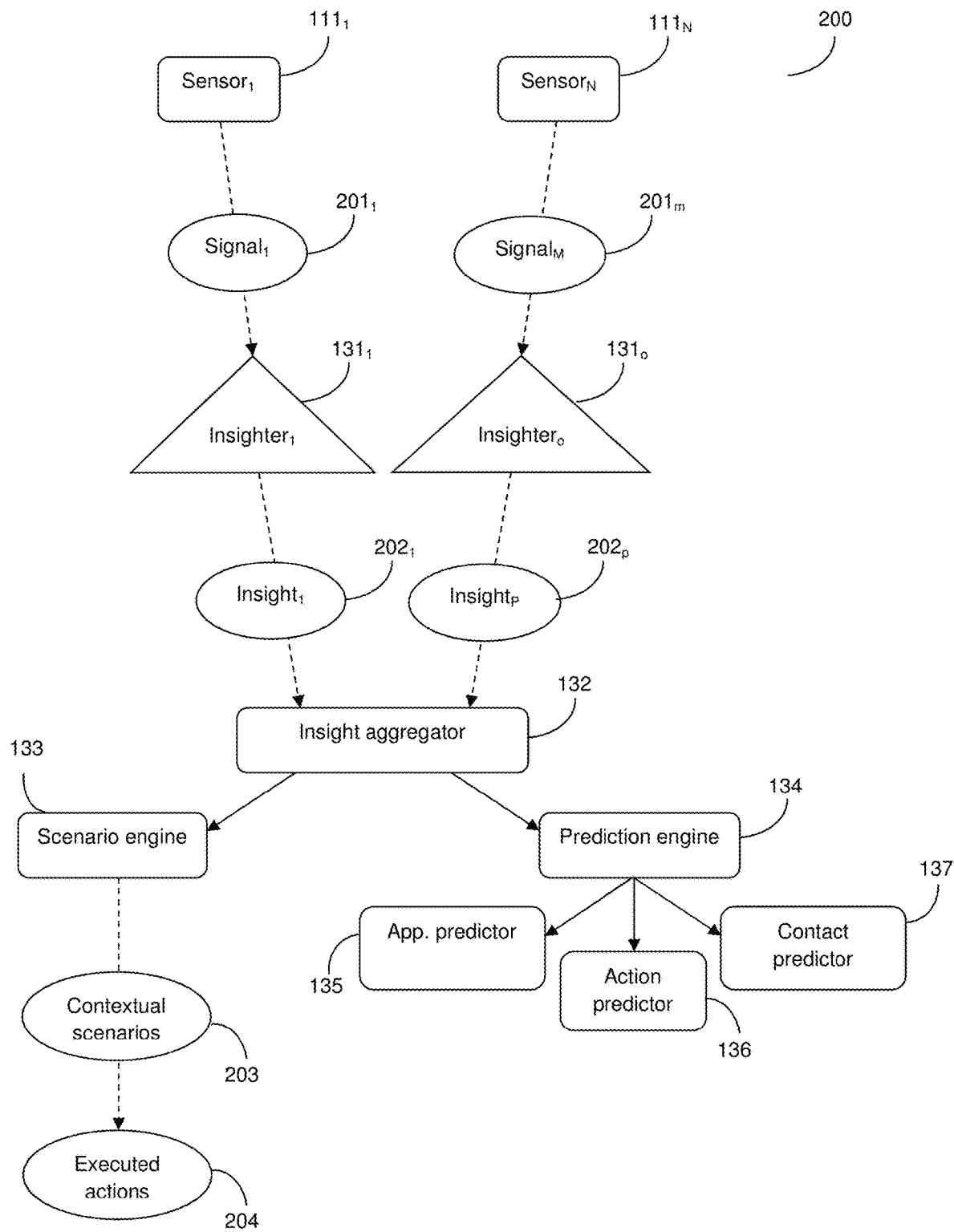
FIG. 2 is a flow diagram illustrating operation of a system utilized to describe the various embodiments.

FIG. 2 depicts an exemplary and non-limiting flow diagram 200 illustrating an operation of the CES 130 based on sensor signals according to an embodiment. In an embodiment, the CES 130 includes a plurality of insighters $131_1$ through $131_O$, an insight aggregator 132, a scenario engine 133, a prediction engine 134, an application predictor 135, an action predictor 136, and a contact predictor 137.

The operation of the CES 130 starts when one or more of a plurality of sensors $111_1$ through $111_N$ collects a plurality of signals $201_1$ through $201_M$ (hereinafter referred to individually as a signal 201 and collectively as signals 201, merely for simplicity purposes). The signals 201 are received by the CES 130. Based on the collected signals 201, the plurality of insighters $131_1$ through $131_O$ are configured to generate a plurality of insights $202_1$ through $202_P$ (hereinafter referred to individually as an insight 202 or collectively as insights 202, merely for simplicity purposes). Each insight 202 relates to one of the collected signals 201.

The insight aggregator 132 is configured to differentiate between the plurality of insights 202 generated by the insighters 131. The differentiation may include, but is not limited to, identifying common behavior patterns as opposed to frequent uses, thereby increasing the efficiency of the insights generation.

According to the disclosed embodiments, a common behavior pattern may be identified when, for example, a particular signal is received at approximately regular intervals. For example, a common behavior pattern may be identified when a GPS signal indicates that a user is at a particular location between 8 A.M. and 10 AM every business day (Monday through Friday). Such a GPS signal may not be identified as a common behavior pattern when the signal is determined at sporadic intervals. For example, a user occupation of the same location on a Monday morning one week, a Friday afternoon the next week, and a Saturday evening on a third week may not be identified as a common behavior pattern. As another example, a common behavior pattern may be identified when an accelerometer signal indicates that a user is moving at 10 miles per hour every Saturday morning. As yet another example, a common behavior pattern may be identified when a user calls a particular contact in the evening on the first day of each month.

The differentiated insights 202 are sent to a contextual scenario engine (CSE) 133 and/or to a prediction engine 134. The CSE 133 is configured to generate one or more contextual scenarios 203 associated with the insights 202 using the contextual database 140 and to execute actions 204 on the user device 110 using the agent 115 respective thereof. Generating contextual scenarios and executing actions respective thereof are described further herein below with respect to FIG. 3.

The prediction engine 134 is configured to predict future behavior of the user device 110 based on the insights 202. Based on the predicted future behavior, the prediction engine 134 may be configured to generate a prediction model. The prediction model may be utilized to determine actions indicating user intents that may be taken by the user in response to particular contextual scenarios. Further, the prediction model may include a probability that a particular contextual scenario will result in a particular action. For example, if user interactions used to generate the prediction model indicate that a user launched an application for seeking drivers 3 out of the last 4 Saturday nights, an action of launching the driver application may be associated with a contextual scenario for Saturday nights and with a 75% probability that the user intends to launch the application on a given Saturday night.

The prediction engine 134 may include an application program predictor (app. predictor) 135 for identifying application programs that are likely to be launched on the user device. The prediction engine 134 may further include an actions predictor 136 for identifying actions that a user is likely to perform on the user device 110. The prediction engine 134 may further include a contact predictor 137 used to identify data related to persons that a user of the user device 110 is likely to contact.

The various elements discussed with reference to FIG. 2 may be realized in software, firmware, hardware or any combination thereof.

It should be noted that FIG. 2 is described with respect to received signals merely for simplicity purposes and without limitation on the disclosed embodiments. The insighters 131 may, alternatively or collectively, generate insights based on variables (e.g., environmental variables and/or personal variables) without departing from the scope of the disclosure.

It should be further noted that the embodiments described herein above with respect to FIGS. 1 and 2 are described with respect to a single user device 110 having one agent 115 merely for simplicity purposes and without limitation on the disclosed embodiments. Multiple user devices, each equipped with an agent, may be used and actions may be executed respective of contextual scenarios for the user of each user device without departing from the scope of the disclosure.

Figure 3:
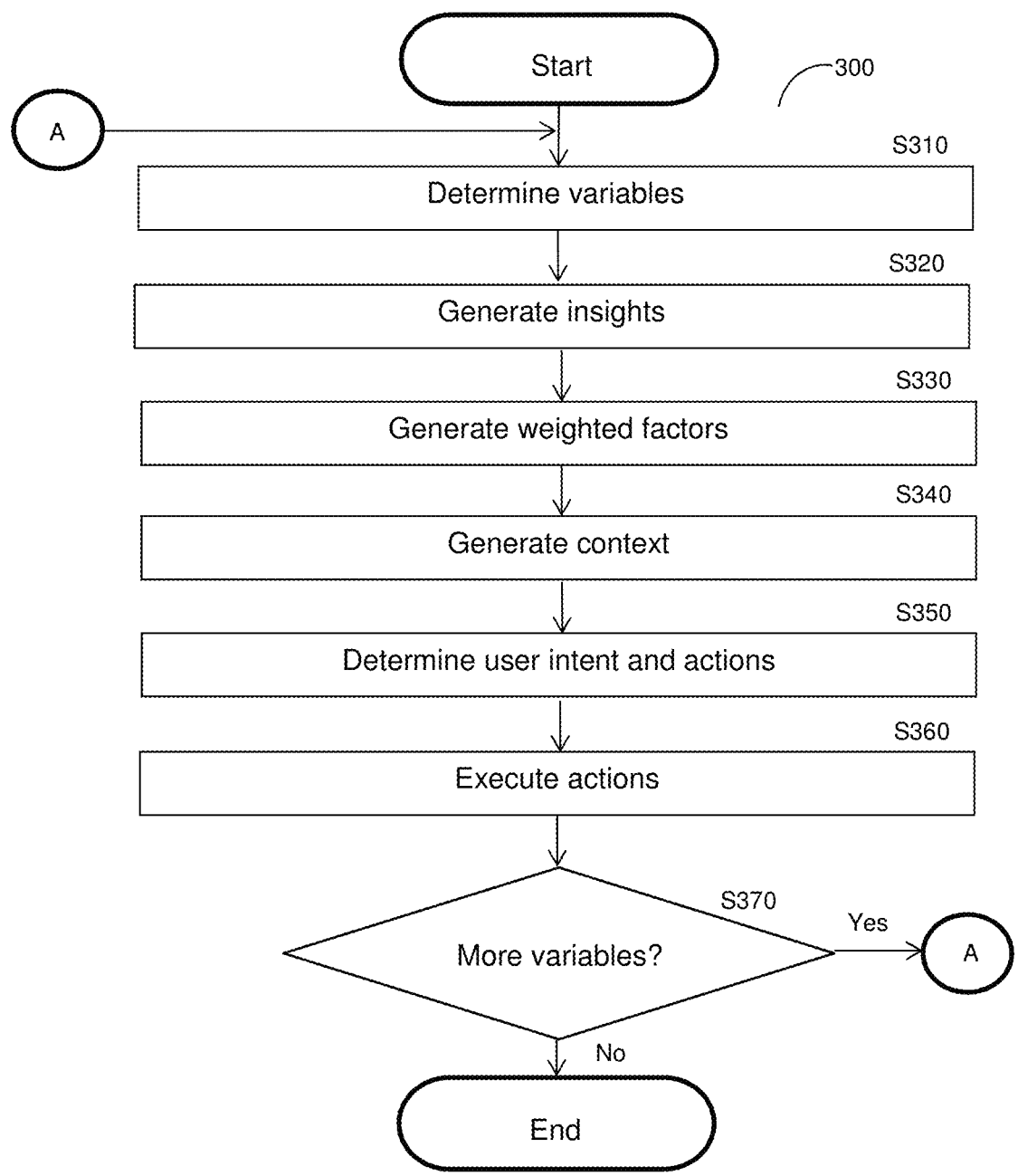
FIG. 3 is a flowchart illustrating generating contextual scenarios and executing actions respective thereof based on use of a user device according to an embodiment.

FIG. 3 depicts an exemplary and non-limiting flowchart 300 of a method for generating contextual scenarios and executing actions based on use of a user device (e.g., the user device 110) according to an embodiment.

In S310, environmental and/or personal variables are determined. In an embodiment, the variables may be, but are not limited to, determined based on sensor signals, retrieved from a database, and so on.

In S320, insights are generated respective of the variables. The insight generation may include, but is not limited to, classifying the variables, generating a conclusion based on the variables, and so on. Generating conclusions about the variables may further be based on past user interactions. Such generated conclusions may indicate, for example, whether a particular variable is related to a user behavior pattern.

In optional S330, a weighted factor is generated respective of each insight. Each weighted factor indicates the level of confidence in each insight, i.e., the likelihood that the insight is accurate for the user's current intent. The weighted factors may be adapted over time. To this end, the weighted factors may be based on, for example, previous user interactions with the user device. Specifically, the weighted factors may indicate a probability, based on previous user interactions, that a particular insight is associated with the determined variables.

In S340, a context is generated respective of the insights and their respective weighted factors. Generating contexts may be performed, for example, by matching the insights to insights stored in a contextual database (e.g., the contextual database 140). The generated context may be based on the contextual scenarios associated with each matching insight. In an embodiment, the matching may further include matching textual descriptions of the insights.

In S350, based on the generated context, a user intent and one or more corresponding actions are determined. The user intent and actions may be determined based on a prediction model. In an embodiment, the prediction model may have been generated as described further herein above with respect to FIG. 2.

In S360, the determined actions are executed on the user device. It should be noted that the actions are performed without user intervention, i.e., the user may not be required to enter any queries, activate any function on the user device, and so on. In an embodiment, the actions are triggered by the agent independently or under the control of the CES 130.

In S370, it is checked whether additional variables have been determined and, if so, execution continues with S310;

otherwise, execution terminates. The checks for additional variables may be performed, e.g., continuously, at regular intervals, and/or upon determination that one or more signals have changed.

In an embodiment, the method of FIG. 3 may be performed by a context enrichment server (e.g., the CES 130). In another embodiment, the method performed by an agent (e.g., agent 115) operable in the user device.

As a non-limiting example, a GPS signal is used to determine environmental variables indicating that the user is at the address of a supermarket on a Saturday morning. Based on the variables, an insight illustrating that the variable is related to a location and a conclusion that variables are in accordance with the user's typical behavior pattern is generated. The insight is further matched to insights stored in a contextual database to identify contextual scenarios associated thereto and a context is generated based on the contextual scenarios. The context indicates that the user is performing his weekly grocery shopping. A prediction model is applied to the context to determine that there is a 90% probability that the user launches a grocery shopping application when at this location on a Saturday morning. Accordingly, the grocery shopping application is launched.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for executing actions based on contextual scenarios related to a user device, comprising:
   determining at least one variable based on at least one signal captured by at least one sensor of the user device, wherein at least one of the at least one variable is a personal variable;

generating at least one insight based on the at least one variable;

generating a weight factor for at least one of the at least one insight, wherein each generated weight factor indicates a level of confidence in each insight;

generating a context for the user device based on the at least one insight and the generated weight factors, wherein the context represents a current state of the user as demonstrated by the at least one insight;

determining, based on the context, a user intent, wherein the user intent includes at least one action; and causing execution of the at least one action on the user device based on the determined context and the determined user intent.

2. The method of claim 1, wherein at least one of the at least one variable is any of: an environmental variable.

3. The method of claim 2, wherein the environmental variable is determined based on the at least one sensor signal collected by the at least one sensor of the user device.

4. The method of claim 1, wherein generating the context further comprises:
matching each insight to a contextual database insight; and
determining, based on the matching, at least one contextual scenario, wherein each determined contextual scenario is associated with one of the matching contextual database insights.

5. The method of claim 1, wherein generating the at least one insight further comprises:
classifying the variables; and
generating a conclusion based on the variables.

6. The method of claim 1, further comprising:
wherein at least one of the at least one action is launching an application program.

7. The method of claim 1, wherein each of the at least one action is any of: displaying an application program, launching an application program, displaying content from the Internet, providing content from the Internet, displaying content from the user device, and providing content from the user device.

8. The method of claim 1, further comprising:
identifying at least one insight demonstrating a common behavior pattern, wherein the context is generated based on the at least one common behavior pattern insight.

9. The method of claim 1, wherein the user intent is determined based on a prediction model.

10. The method of claim 9, wherein the prediction model is generated based on at least one user interaction and at least one insight.

11. A non-transitory computer readable medium having stored thereon instructions for causing one or more processing units to execute the method according to claim 1.

12. A user device configured to execute actions based on contextual scenarios related to the user device, comprising:
at least one sensor;
a processing unit; and
a memory, the memory containing instructions that, when executed by the processing unit, configure the user device to:
determine at least one variable based on at least one signal captured by at least one sensor of the user device, wherein at least one of the at least one variable is a personal variable;
generate at least one insight based on the at least one variable generated by the at least one sensor;
generate a weight factor for at least one of the at least one insight, wherein each generated weight factor indicates a level of confidence in each insight;
generate a context for the user device based on the at least one insight and the generated weight factors, wherein the context represents a current state of the user as demonstrated by the at least one insight;
determine, based on the context, a user intent, wherein the user intent includes at least one action; and
execute the at least one action on the user device, wherein the at least one action is selected based on the determined context and the determined user intent.

13. A system for executing actions based on contextual scenarios related to a user device, comprising:
a processing unit; and
a memory, the memory containing instructions that, when executed by the processing unit, configure the system to:
determine at least one variable based in part on at least one signal captured by at least one sensor of the user device, wherein at least one of the at least one variable is a personal variable;
generate at least one insight based on the at least one variable;
generate a weight factor for at least one of the at least one insight, wherein each generated weight factor indicates a level of confidence in each insight;
generate a context for the user device based on the at least one insight and the generated weight factors, wherein the context represents a current state of the user as demonstrated by the at least one insight;
determine, based on the context, a user intent, wherein the user intent includes at least one action; and
cause execution of the at least one action on the user device, wherein the at least one action is selected based on the determined context and the determined user intent.

14. The system of claim 13, wherein at least one of the at least one variable is an environmental variable.

15. The system of claim 14, wherein the environmental variable is determined based on the at least one sensor signal collected by the at least one sensor of the user device.

16. The system of claim 13, wherein the system is further configured to:
match each insight to a contextual database insight; and
determine, based on the matching, at least one contextual scenario, wherein each determined contextual scenario is associated with one of the matching contextual database insights.

17. The system of claim 13, wherein the system is further configured to:
classify the variables; and
generate a conclusion based on the variables.

18. The system of claim 13, wherein the system is further configured to:
wherein at least one of the at least one action is launching an application program.

19. The system of claim 13, wherein each of the at least one action is any of: displaying an application program, launching an application program, displaying content from the Internet, providing content from the Internet, displaying content from the user device, and providing content from the user device.

20. The system of claim 13, wherein the system is further configured to:

identify at least one insight demonstrating a common behavior pattern, wherein the context is generated based on the at least one common behavior pattern insight.

21. The system of claim 13, wherein the user intent is determined based on a prediction model.

22. The system of claim 21, wherein the prediction model is generated based on at least one user interaction and at least one insight.

* * * * *